United States Patent [19]

Bishop

[11] Patent Number: 4,629,287
[45] Date of Patent: Dec. 16, 1986

[54] ULTRAVIOLET CURABLE BUFFER COATINGS FOR OPTICAL FIBER

[75] Inventor: Timothy E. Bishop, Des Plaines, Ill.

[73] Assignee: DeSoto, Inc., Des Plaines, Ill.

[21] Appl. No.: 705,121

[22] Filed: Feb. 25, 1985

[51] Int. Cl.[4] .................. G02B 6/00; C08F 299/06
[52] U.S. Cl. .................. 350/96.34; 522/96; 525/455; 525/920; 528/75; 350/96.3
[58] Field of Search .......... 204/159.19; 350/96.30, 350/96.34; 522/96; 525/455, 920

[56] References Cited

U.S. PATENT DOCUMENTS

| | | | |
|---|---|---|---|
| 4,271,223 | 6/1981 | Lambert et al. | 204/159.19 |
| 4,271,258 | 6/1981 | Watariguchi | 204/159.19 |
| 4,457,818 | 7/1984 | Denyer et al. | 204/159.19 |
| 4,472,019 | 9/1984 | Bishop et al. | 204/159.19 |

*Primary Examiner*—Wilbert J. Briggs, Sr.
*Attorney, Agent, or Firm*—Dressler, Goldsmith, Shore, Sutker & Milnamow, Ltd.

[57] ABSTRACT

An ultraviolet curing liquid coating composition is disclosed which, when cured with ultraviolet light in the presence of a photoinitiator, provides a buffer coating for optical glass fiber having adequate strength at room or expected elevated temperature and stability at such elevated temperature, a high index of refraction above 1.48, and a low tensile modulus which remains low to resist microbending difficulties down to around −60° C. This coating composition consists essentially of a linear polyacrylate-terminated polyurethane oligomer in admixture with a liquid linear aliphatic diacrylate in which the two acrylate groups are separated by a molecular weight of at least 400 up to about 4000, said liquid linear diacrylate providing said coating composition with a viscosity suitable for coating application.

16 Claims, No Drawings

ULTRAVIOLET CURABLE BUFFER COATINGS FOR OPTICAL FIBER

TECHNICAL FIELD

This invention relates to ultraviolet curable coatings intended to be applied directly to the glass surface of optical glass fiber to protect the same, these coatings providing low tensile modulus at low service temperature so as to resist microbending. Coatings of this character are too soft to be used alone, so they are normally overcoated with a harder and stronger coating to better resist the stresses which are expected to be encountered.

BACKGROUND ART

Optical glass fiber must be coated to protect its surface against abrasion, and normal heat-cured coatings are slow curing, so it has been desired to employ ultraviolet-curing coating compositions. This proved to be quite difficult in practice because the optical fiber must be expected to encounter a wide range of service temperatures, including very low service temperatures, and the usual ultraviolet-cured coatings are too hard to begin with or become too hard at the lower temperatures. This excessive hardness causes the difference between the thermal coefficient of expansion of the coating and the thermal coefficient of expansion of the glass to produce microbends in the fiber which interfere with the capacity of the fiber to convey optical messages.

Industry experienced great difficulty in providing ultraviolet curing coatings which would protect the glass surface against mechanical stress without inducing microbending difficulties at low service temperature until our coworker, R. E. Ansel in application Ser. No. 170,148 filed July 18, 1980 found that certain urethane oligomer diacrylates could be combined with appropriate mixtures of monoethylenically unsaturated monomers including a large proportion of a monomer of low glass transition temperature to provide a primer or buffer coating which could then be overcoated with a stronger and harder topcoat to provide the combination of properties which was needed. However, a small proportion of a hydrogen bonding monomer was needed to obtain adequate strength at room and elevated temperature, and this led to high modulus at very low temperature.

Another problem is the desire to employ coatings of high refractive index above 1.48. The optical fiber industry prefers to employ coatings of high refractive index because there is reason to believe the higher index of refraction will cause less attenuation in the light passing through the fiber. The coatings provided in the aforesaid Ansel application provide ultraviolet-cured coatings having the desired high refractive index, and this is an advantage of those coatings.

Unfortunately, the coatings disclosed in the aforesaid Ansel application are only able to resist temperatures down to around $-40°$ C., and in some instances it is desired to extend the service temperature down to around $-60°$ C. While some ultraviolet curing coatings have been found to possess the desired low tensile modulus at low temperature required to resist microbending at $-60°$ C., some of these possess a refractive index below 1.48, and are less desirable for this reason.

One cannot merely select very soft coatings because most of these have very poor properties at room or higher temperature, or have poor heat stability. Optical fibers will not only encounter low service temperatures from time to time, but they will also encounter elevated service temperatures. The buffer coatings must retain some minimal strength at these elevated temperatures, and they must be stable at elevated temperature so as not to acquire greater hardness which induces microbending when low temperatures are subsequently encountered.

This invention intends to provide ultraviolet curing coating compositions which cure to provide buffer coatings for optical glass fibers which exhibit a combination of low tensile modulus which is maintained low at low temperature, high refractive index above 1.48, and reasonable resistance to elevated temperature combined with good stability at such elevated temperature.

DISCLOSURE OF INVENTION

In accordance with this invention, an ultraviolet curing liquid coating composition is provided which, when cured with ultraviolet light in the presence of a photoinitiator, provides a buffer coating for optical glass fiber having adequate strength at room or expected elevated temperature and is stable at such elevated temperature, a high index of refraction above 1.48, and a low tensile modulus which remains low to resist microbending difficulties down to around $-60°$ C. This coating composition consists essentially of a linear polyacrylate-terminated polyurethane oligomer (which may be of various type, including that disclosed in the Ansel application, but which is preferably of the type disclosed hereinafter which is also a polyurea) in admixture with a relatively high molecular weight liquid linear aliphatic diacrylate in which the two acrylate groups are separated by a linear chain containing at least 6 carbon atoms, or where less than 6 carbon atoms are present in the chain, that chain has a molecular weight of from 400 to about 4000, preferably from 600 to 2500. Polyoxyalkylene glycol diacrylates are preferred, especially polyoxybutylene glycol diacrylates having a molecular weight of from 800 to 2000. The above polyacrylate-terminated oligomer is preferably based on a diisocyanate in which a linear aliphatic chain containing at least 6 carbon atoms separates the two isocyanate groups, and this diisocyanate is reacted with a polyether or polyester containing alkylene groups having from 1 to 6 carbon atoms and a molecular weight in the range of 500 to 4000, to form a polyurethane diisocyanate which is half end capped with a monohydric acrylate and reacted with a $C_1$ to $C_4$ oxyalkylene diamine having a molecular weight of from 100 to 600 to consume the isocyanate groups.

The compositions of this invention normally have an index of refraction above 1.48, and possess a tensile modulus far lower than was previously obtainable using the teachings of the said Ansel application. As a result, microbending difficulties are now avoidable down to around $-60°$ C.

Referring more particularly to the linear polyacrylate-terminated polyurethane oligomer which is used herein, these may be the same as those taught in the prior Ansel application and have a molecular weight of about 2000 to about 8000 with one linking group selected from urethane, urea or amide groups for every 300 to 900 units of weight, but it is preferred to employ oligomers which are based on a diisocyanate in which a linear aliphatic chain containing at least 6 carbon atoms separates the two isocyanate groups. Any long chain aliphatic diisocyanate can be used, such as 1,12-dodecyl diisocyanate. The preferred diisocyanates are dimer fatty acid diisocyanates. Dimer fatty acids are dicarboxylic acids formed by dimerizing fatty acids which usually contain 18 carbon atoms, and this provides a 36 carbon atom dicarboxylic acid. When these two terminal carboxylic acid groups are converted to isocyanate groups, the result is a $C_{36}$ diisocyanate.

The separation of the two isocyanate groups may include other groups in addition to the long carbon chain. Thus, dimer fatty acids may be reacted with ethylene oxide to provide hydroxy ester groups, or with several moles of ethylene oxide to add ether groups, and then the hydroxy-terminated product so-provided can be reacted with excess diisocyanate to provide isocyanate terminal groups. Also, the two carboxy groups in the starting dimer fatty acid can be converted to amine groups in known fashion, and the resulting diamine can be reacted with excess diisocyanate to provide a diisocyanate which still contains the 36 carbon atoms chain which has been found to provide the new properties desired herein.

The above long chain aliphatic diisocyanate is reacted with a polymer or polyester containing alkylene groups having from 1 to 6 carbon atoms (preferably 2 or 3 carbon atoms) and a molecular weight in the range of 500 to 4000. It is preferred to employ polyoxyalkylene glycols having a molecular weight in the range of 1000 to 3000, and in which the alkylene groups contain from 1-4 carbon atoms. These are illustrated by polyoxyethylene glycol having a molecular weight of 1500, 2000 or 2500, polyoxypropylene glycol of corresponding molecular weight, and polytetramethylene glycol of molecular weight 1000. Polyoxyethylated or polyoxypropylated diols, such as butane diol, hexane diol, polyoxyethylene glycol or polyoxypropylene glycol, are also useful.

Polyesters which may be used are illustrated by polycaprolactone glycols, such as the commercially available Tone 0240 from Union Carbide Corporation which is a polycaprolactone glycol having a molecular weight of about 2000.

The reaction between the previously described diisocyanate, which is used in an excess of preferably one mole of diisocyanate per hydroxy group, and the glycol forms a polyurethane diisocyanate.

The above polyurethane diisocyanate is then half end capped with a monohydric acrylate, such as a $C_2$ to $C_4$ hydroxyalkyl acrylate. Any monohydric acrylate may be used to end cap the isocyanate functional oligomers used herein, typically 2-hydroxyethyl acrylate. 2-hydroxypropyl acrylate and 2-hydroxybutyl acrylate are also useful. Trimethylol propane diacrylate or pentaerythritol triacrylate will further illustrate the class of useful monohydric alcohols.

The half end capped diisocyanate is reacted with a $C_1$ to $C_4$ oxyalkylene diamine having a molecular weight of from 100 to 600 to consume the remaining isocyanate functionality. The sequence of reactions is not important, for end capping can precede, follow or be simultaneous with the reaction with the diamine. As is well known, the diamine will form two urea groups, one from each of the two amine groups, to chain extend the half end capped diisocyanate (which is an unsaturated monoisocyanate). Typical diamines are amine-terminated polyethers, such as polyoxyethylene, or preferably polyoxypropylene, with the polyether chain providing the bulk of the needed molecular weight. These are specifically illustrated by polyoxypropylene diamine of molecular weight 200 and 400 and by polyoxyethylene diamine of molecular weight 300.

The linear polyacrylate-terminated polyurethane oligomers are used in this invention in admixture with a liquid linear aliphatic diacrylate in which the two acrylate groups are separated by a molecular weight of at least 400 up to about 4000 to provide the coating composition with a viscosity suitable for coating application. In the prior art, the short chain polyacrylates which were used, such as butane diol diacrylate, trimethylol propane diacrylate and triacrylate, the pentaerythritol triacrylate, greatly increased and the tensile modulus of the coatings leading to excessively high tensile modulus at low temperatures, such as $-60°$ C. which represents a low service temperature which it is desired to be able to resist without microbending. In this invention, the diacrylates under consideration allow the formation of ultraviolet-cured coatings which retain a much lower tensile modulus at $-60°$ C.

The preferred diacrylates have a molecular weight of from 600 to 2500 and the two acrylate groups are desirably separated by a polyoxybutylene structure, as illustrated in the Example. The preferred polyoxybutylene glycol diacrylates have a molecular weight of from 800 to 2000. Other liquid linear aliphatic diacrylates which may be used are 1,12-dodecyl diacrylate and the reaction product of 2 moles of acrylic acid with one mole of dimer fatty alcohol, these normally having 36 carbon atoms.

Commercially available products which may be used as the liquid linear aliphatic diacrylate components are Chemlink products 9000 and 9001 as well as 2000.

The primary factor governing the proportion of liquid linear alphatic diacrylate is the desired coating viscosity, but the diacrylate proportion can also be specified in weight percent, namely: from 5% to 50% of the composition, preferably from 15% to 40%.

While liquid monoethylenically unsaturated monomers providing greater fluidity may be present in small proportion up to about 20% of the composition, these are desirably absent because they sacrifice desired properties or slow the cure. When used, these monomers should have a glass transition temperature of less than 0° C., preferably less than $-20°$ C. The glass transition temperature is measured on a homopolymer of the monomer. Thus, the desired fluidity can be obtained by using a sufficient proportion of the described liquid long chain diacrylate, or one may add a small proportion of a low glass transition temperature monoethylenic monomer which will participate in the cure, such as ethoxyethoxyethyl acrylate, phenoxyethyl acrylate, dimethylaminoethyl acrylate, butoxyethyl acrylate, or 2-hydroxyethyl acrylate.

Butoxyethyl acrylate used in an amount of from 2% to 8% is especially helpful since it provides favorable low temperature characteristics.

It is stressed that favorable low temperature characteristics can be obtained using the above-described monoethylenic monomers, but this sacrifices room temperature strength and cure speed, and this is where the liquid long chain diacrylates used herein are unique in combining reasonable properties at both room temperatures and $-60°$ C. with superior cure speed.

The coating compositions of this invention are intended to be cured with ultraviolet light, so photoinitiators are normally present in an amount of from 0.5% to 8%, preferably from 2% to 5%. These are conventional components of ultraviolet curing ethylenically unsaturated coatings, the usual photoinitiators being ketonic, such as benzophenone, acetophenone, diethoxy acetophenone, m-chloro-acetophenone, propiophenone, thioxanthone, benzoin, benzil, anthraquinone, and the like. Benzophenone is quite effective in this invention, but is is presently preferred to use dimethoxybenzo acetophenone which is available in commerce under the trade designation Irgacure 651. These photoinitiators may be used alone or in admixture with one another, and amines, like diethyl amine, can be added as photosensitizer, though this is not normally needed.

The coating compositions of this invention are normally free of volatile organic solvents since these would have to be evaporated before ultraviolet exposure, which would slow the curing system.

Throughout this description and also in the claims, all proportions are by weight. The invention is illustrated as follows.

EXAMPLE 245.8 grams of dimer $C_{36}$ fatty acid diisocyanate (Henkel DDI 1410 may be used), 0.2476 gram of phenothiazine and 0.2476 gram of dibutyl tin dilaurate are charged to a reactor where they are blanketed with nitrogen gas and stirred while heating to 60° C. There is then added to the reactor at 60° C. over a 20–30 minute period, 206.35 grams of polypropylene glycol having an average molecular weight of about 1,000. The mixture so-formed contains 2 moles of diisocyanate per mole of the glycol and is stirred for an additional ½ hour to complete the reaction between the hydroxy and isocyanate functionalities. 25 grams of dimethylaminoethyl acrylate are then added over a 20 minute period to reduce the viscosity with a monomer having a low glass transition temperature. 23.8 grams of 2-hydroxyethyl acrylate are then added over a 20 minute period and stirring is continued for an additional hour to end cap half of the diisocyanate-terminated polyurethane which is present. 24.5 grams of a polyoxyethylene diamine having a molecular weight of about 230 (Texaco product Jeffamine D230 may be used) are then added to the reactor and stirred at 60° C. until residual isocyanate functionality is no longer detectable. The added diamine provides one amine group per NCO group remaining in the reaction mixture, and the result is a diacrylate-functional polyurethane polyurea oligomer prepared from long-chain aliphatic materials.

67 part of the above diacrylate polyurethane polyurea oligomer is mixed with 20 parts of a polyoxybutylene glycol diacrylate having a molecular weight of 1150 and catalyzed with 3 parts of Irgacure 651 and stabilized with 0.01 part of phenothiazine.

This composition was coated upon glass to form a film 3 mil thick which is cured by exposure to ultraviolet light using medium pressure mercury vapor lamps which supply ultraviolet light having a wavelength ranging from about 260 to about 380 nanometers. The ultraviolet dose is about 3.5 Joules/cm$^2$.

The cured films are stripped from the glass support and tested to provide the following data.

At 25° C. the tensile strength is 138 psi., the modulus is 303 psi. and the elongation is 58%. At −60° C., the tensile strength is 2889 psi., the tensile modulus is 52,800, and the elongation is 37%. These properties identify a clearly superior coating for the buffer coating of optical glass fiber when it is appreciated that the composition is stable at expected elevated service temperature and cures to provide a film having a refractive index of about 1.54.

In contrast, a typical commercial composition in accordance with the disclosure of said application Ser. No. 170,148 coated and cured in the same way provides a film having a 25° C. strength of 500 psi, a tensile modulus of 500 psi., and an elongation of 170%. At −60° C., the tensile strength increased to 8700 psi., the modulus increased to 290,000 psi., and the elongation was only 5%. Thus, these cured coatings at −60° C. are much harder and more brittle than those obtained herein.

Using the diacrylate oligomer of this example in the typical commercial composition referred to above to provide a composition containing 63.11% of the diacrylate oligomer of this example, 24.27% phenoxyethyl acrylate, 9.70% N-vinyl pyrrolidone, 2.91% benzophenone, and 0.01% phenothiazine, the −60° C. tensile modulus was 177,300 psi. at an elongation of 25%. Replacing the monoethylenic monomers in this composition with the same weight proportion of the liquid diacrylate specified in this example, the −60° C. tensile modulus was lowered to 75,700 psi. and the elongation increased to 49%.

All of these coatings have about the same desirable refractive index of about 1.54.

The coatings of this invention are applied to freshly drawn optical glass fiber having a diameter of about 125 microns in a thickness of about 125 microns and are cured by passing the coated fiber through two tandemly arranged 10 inch 300 watts medium pressure vapor lamp at 1.5 meters per second.

Repeating the previous example using a lower molecular weight polyoxybutylene glycol diacrylate (calculated molecular weight of 800), the low temperature properties were very acceptable, albeit not quite as good as with the higher molecular weight product. Similarly, using a diacrylate in which an alkylene chain of 15 carbon atoms length is used as the liquid diacrylate, the low temperature properties were again acceptable, albeit not quite as good as when the two polyoxybutylene glycol diacrylates were employed.

What is claimed is:

1. An ultraviolet curing liquid coating composition which, when cured with ultraviolet light in the presence of a photoinitiator sensitive to ultraviolet light, provides a buffer coating for optical glass fiber having adequate strength at room or expected elevated temperature and stability at such elevated temperature, at high index of refraction above 1.48, and a low tensile modulus which remains low to resist microbending difficulties down to around −60° C., said coating composition consisting essentially of a linear polyacrylate-terminated polyurethane oligomer in admixture with liquid linear aliphatic diacrylate in which the two acrylate groups are separated by a molecular weight of from 600 to 2500, said linear liquid diacrylate being present in an amount of from 5% to 50% of the composition and providing said coating composition with a viscosity suitable for coating application.

2. A coating composition as recited in claim 1 in which said two acrylate groups are separated by a polyoxybutylene structure.

3. A coating composition as recited in claim 1 in which said linear liquid diacrylate is a polyoxybutylene glycol diacrylate having a molecular weight of from 800 to 2000.

4. An ultraviolet curing liquid coating composition which, when cured with ultraviolet light in the presence of a photoinitiator sensitive to ultraviolet light, provides a buffer coating for optical glass fiber having adequate strength at room or expected elevated temperature and stability at such elevated temperature, a high index of refraction above 1.48, and a low tensile modulus which remains low to resist microbending difficulties down to around −60° C., said coating composition consisting essentially of a linear polyacrylate-terminated polyurethane oligomer in admixture with liquid linear aliphatic diacrylate in which the two acrylate groups are separated by at least a chain of 6 carbon atoms or by a molecular weight of at least 400 up to about 4000, said linear liquid diacrylate being present in an amount of from 5% to 50% of the composition and providing said coating composition with a viscosity suitable for coating application, said polyacrylate-terminated polyurethane oligomer having a molecular weight of about 2000 to about 8000 with one linking group selected from urethane, urea or amide groups for every 300 to 900 units of weight.

5. An ultraviolet curing liquid coating composition which, when cured with ultraviolet light in the presence of a photoinitiator sensitive to ultraviolet light, provides a buffer coating for optical glass fiber having adequate strength at room or expected elevated temperature and stability at such elevated temperature, a high index of refraction above 1.48, and a low tensile modulus which remains low to resist microbending difficulties down to around −60° C., said coating composition consisting essentially of a linear polyacrylate-terminated polyurethane oligomer in admixture with liquid linear aliphatic diacrylate in which the two acrylate groups are separated by at least a chain of 6 carbon atoms or by a m olecular weight of at least 400 up to about 4000, said linear liquid diacrylate being present in an amount of from 5% to 50% of the composition and providing said coating composition with a viscosity suitable for coating application, said polyacrylate-terminated polyurethane oligomer being based on a diisocyanate in which a linear aliphatic chain containing at least 6 carbon atoms separates the two isocyanate groups, and this diisocyanate is reacted with a polyether or polyester containing alkylene groups having from 1 to 6 carbon atoms and a molecular weight in the range of 500 to 4000, to form a polyurethane diisocyanate.

6. A coating composition as recited in claim 6 in which said polyacrylate-terminated polyurethane oligomer is a polyurea, and said polyurethane diisocyanate is half end capped with a monohydric acrylate and reacted with a $C_1$ to $C_4$ oxyalkylene diamine having a molecular weight of from 100 to 600 to consume the isocyanate functionality.

7. A coating composition as recited in claim 5 in which said diisocyanate is provided by dimer fatty acid diisocyanate.

8. A coating composition as recited in claim 5 in which said dimer fatty cid diisocyanate contains 36 carbon atoms.

9. A coating composition as recited in claim 5 in which said diisocyanate is reacted with a polyether which is a polyoxyalkylene glycol having a molecular weight in the range of 1000 to 3000.

10. A coating composition as recited in claim 9 in which said oxyalkylene glycol contains 2 or 3 carbon atoms.

11. A coating composition as recited in claim 10 in which said polyurethane diacrylate is reacted with 2-hydroxyethyl acrylate.

12. A coating composition as recited in claim 1 in which said liquid linear diacrylate is present in an amount of from 15% to 40% of the composition.

13. A coating composition as recited in claim 12 in which said composition includes up to 20% of monoethylenically unsaturated monomer having a glass transition temperature below 0° C.

14. A coating composition as recited in claim 12 in which said composition includes up to 10% of monoethylenically unsaturated monomer having a glass transition temperature below −20 C.

15. A coating composition as recited in claim 14 in which said composition includes up to 10% of butoxyethyl acrylate.

16. An optical glass fiber buffer coated with an ultraviolet-cured coating of the composition of claim 1.

* * * * *

UNITED STATES PATENT AND TRADEMARK OFFICE
CERTIFICATE OF CORRECTION

PATENT NO. : 4,629,287
DATED : December 16, 1986
INVENTOR(S) : Timothy E. Bishop It is certified that error appears in the above-identified patent and that said Letters Patent is hereby corrected as shown below:

Column 3, line 24, "witha" should read: --with a--;

Column 4, line 12, "the" should read: --and--;

Column 4, line 13, delete: --and-;

Claim 1, line 48, "at high" should read: --a high--;

Claim 5, line 14, "m olecular" should read: --molecular--;

Claim 6, line 1, change the claim dependency to: --5--

Claim 8, line 2, "cid" should read: --acid--; and

Claim 14, line 4, "-20 C." should read: -- -20°C.--.

Signed and Sealed this

Twenty-ninth Day of December, 1987

Attest:

DONALD J. QUIGG

*Attesting Officer*  *Commissioner of Patents and Trademarks*